United States Patent [19]
Suffi

[11] Patent Number: 4,652,070
[45] Date of Patent: Mar. 24, 1987

[54] INSULATION DISPLACEMENT CONNECTOR TERMINAL BLOCK
[75] Inventor: Louis Suffi, Westchester, Ill.
[73] Assignee: Reliance Electric Company, Cleveland, Ohio
[21] Appl. No.: 789,084
[22] Filed: Oct. 18, 1985
[51] Int. Cl.$^4$ ............................................. H01R 4/24
[52] U.S. Cl. .................................................. 339/97 P
[58] Field of Search ................. 339/97 R, 97 P, 98, 339/99 R

[56] References Cited
U.S. PATENT DOCUMENTS
3,496,522  2/1970  Ellis, Jr. et al. ................. 339/99 R
3,910,670 10/1975  Spaulding et al. .................... 339/98
4,040,701  8/1977  Gressitt et al. ................... 339/99 R
4,486,064 12/1984  Long et al. ....................... 339/99 R Primary Examiner—Joseph H. McGlynn
Attorney, Agent, or Firm—Michael M. Rickin

[57] ABSTRACT

There is disclosed a connector block for establishing connections with insulated electrical conductors capable of being stripped. The block as a number of projections. Mounted in each projection is a connector of the insulation displacement type. Associated with each projection is an activator, part of which fits in the aperture of the projection in which the connector is mounted. The conductors to be stripped are inserted in the activator. The activator is then moved into contact with the connector.

13 Claims, 9 Drawing Figures

INSULATION DISPLACEMENT CONNECTOR TERMINAL BLOCK

BACKGROUND OF THE INVENTION

1. Field of the Invention

This invention relates to terminal blocks and more particularly to a terminal block of the type which uses insulation displacement clips as the means by which the cable pairs are connected to the block.

2. Description of the Prior Art

Terminal blocks are used in the telecommunications industry to provide an interconnection point for cable pairs. The blocks may be of any size and the particular size depends on the application. Small size blocks are used to interconnect five or ten cable pairs with the service wires to the subscriber's premises. Larger size blocks, typically each in the order of 25 or 50 pairs, are used to interconnect a central office cable to the multi-pair cables servicing a local area such as housing subdivision.

No matter what the size of the blocks or their intended usage they are housed in an enclosure which may be pad mounted, pole mounted or partially buried in the ground. Typically, the blocks for 25 or 50 pairs are grouped in an appropriate configuration which is determined by the total number of pairs to be interconnected and are then placed in an enclosure of either the pole mounted or pad mounted type. Typically, the five or ten pair blocks are placed in an enclosure which is of the partially buried type. In any case the blocks while enclosed are subject to an outdoor environment.

Terminal blocks for use outdoors now have binding posts as the means by which the wires can be connected to the block. These connections are made in the field by a craftsperson who must first strip each wire to be connected and then wrap the exposed wire around a stud. The connection is held in place by tightening a screw. One such example of a binding post terminal block for outdoor usage is that of the BT type currently sold by assignee's Reliable Electric operating unit.

Terminal blocks are also used indoors for purposes of interconnection. The indoor blocks differ from those used outdoors, mainly in that the indoor blocks use insulation displacement connectors. The connectors automatically strip the insulation off a portion of the wire when it is inserted therein by a special hand operated tool. It has long been desired to facilitate the connecting of the wires by eliminating the special tool. It has also been desired to use such insulation displacement connectors in blocks designed for outdoor usage. The connectors do not, however, perform very well in such an environment due to the inadequate environmental protection inherent in the typical prior art block design. Therefore, while it is desirable to use such connectors outdoors, the connectors must be protected from that environment. The use of the special tool should be eliminated whether the connectors are used indoors or outdoors.

SUMMARY OF THE INVENTION

A connector block for establishing connections with insulated electrical conductors which are capable of being stripped. The block has a supporting structure which is made up of at least one projection. The projection has side walls and a top. The projection has in it an aperture of predetermined shape. The aperture extends downwardly a sufficient distance to accommodate an electrical connector. The connector is of the type which has a connection part which is capable of stripping insulated conductors. The distance is such that the insulation stripping connection part is below the top when the connector is inserted in the aperture.

The block has a U-shaped activator for slidably fitting into the aperture. The activator has a cap and first and second elongate projections which extend downwardly from the cap. The projections are parallel to each other and form a hollow space therebetween. The space is sufficient to allow the insulation stripping part of the connector to fit therein which the activator is slidably fitted into the aperture. Each projection includes an opening. The openings are capable of accepting one of the electrical conductors such that a part of that conductor appears in the gap.

The activator is inserted in the aperture in a manner such that when a force is exerted against the cap the conductor comes in contact with the connection part.

DESCRIPTION OF THE DRAWING

FIG. 2A shows the activator in a raised position with a conductor inserted therein. FIG. 2B shows the activator of FIG. 2A fully inserted in the aperture of the projection.

FIG. 3A shows the activator in a raised position with conductors inserted therein. FIG. 3B shows the activator fully inserted in the projection.

DESCRIPTION OF THE PREFERRED EMBODIMENT

Figure 1:
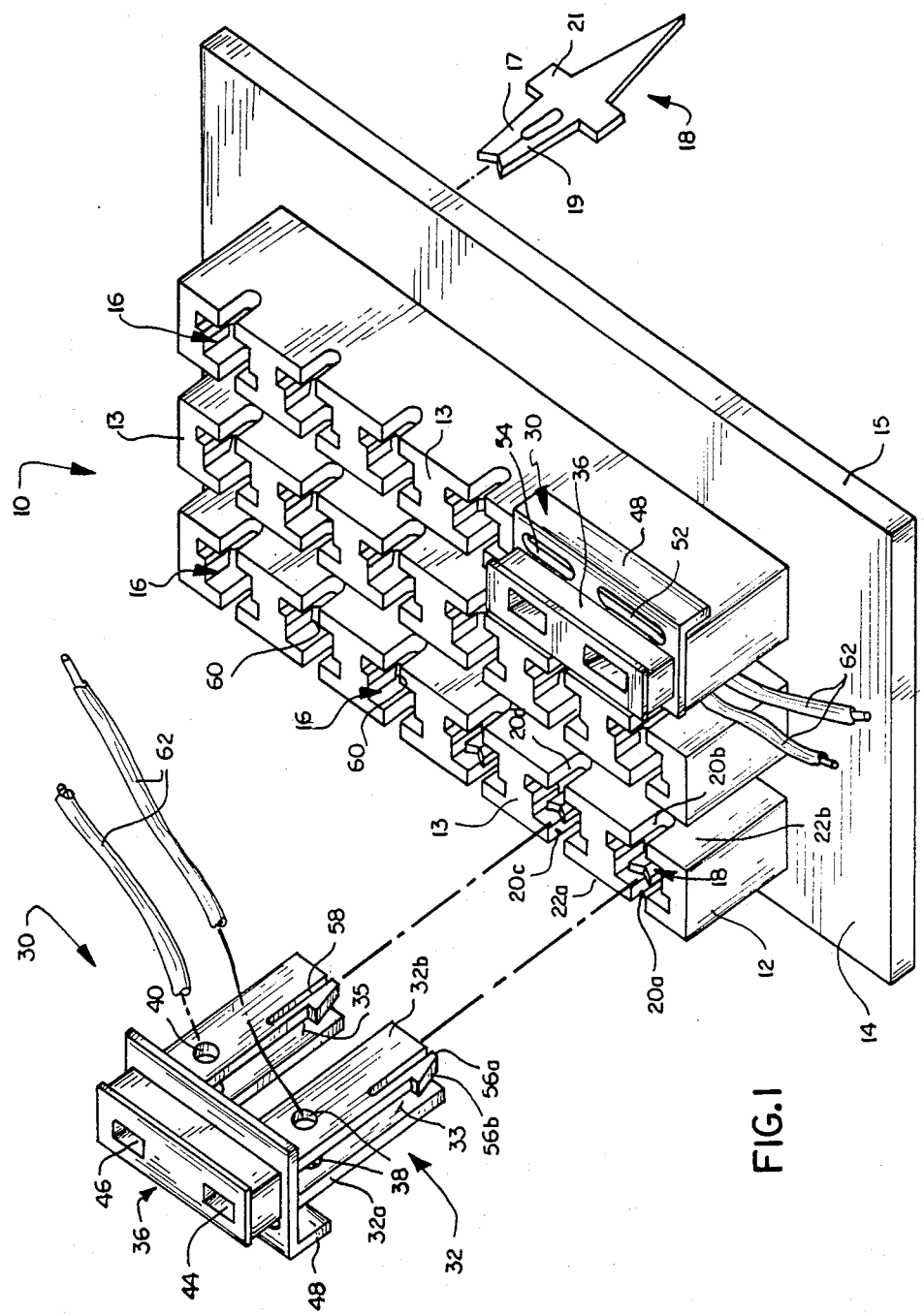
FIG. 1 is a partially exploded view of the connector block of the present invention.

Referring now to FIG. 1 there is shown a connector block 10 which includes a number of insulation displacement connectors. The block 10 is manufactured out of any suitable insulating material such as plastic. The block 10 has a number of generally rectangular projections 12 which extend upwardly from the front face 14 thereof. Each of the projections has an aperture 16 therein. The apertures 16 extend completely through the projections 12 from the top 13 thereof to and through the front face 14 of block 10. Mounted in each aperture 16 is a connector 18 of the insulation displacement type (also known as a clip). Each pair of the projections 12 is then capable of being used to make connections connected to the two wires (known as tip and ring) making up one pair of the typical multi-pair telecommunications cable. If the block 10 were of the 25 pair type it would then have 50 such projections 12 which might for example be arranged in five rows of ten projections each.

Each of the two apertures 16 in each pair of projections 12 is generally rectangular in shape. Each of the projections 12 have four slots 20a, 20b, 20c and 20d which are located in the parallel walls 22a, 22b that make up the long sides of the generally rectangular projections 12. The slots 20a to 20d provide a channel for the wires to be used in the electrical connection. Two of the slots 20a, 20b are located in wall 22a and the remaining two of the slots 20c, 20d are located in wall 22b. Slots 20d and 20c are opposite each other and slots 20b and 20d are also opposite each other. The slots 20a to 20d extend downwardly from the top 13 of the pair of projections 12 partway toward the front face 14 of the block 10.

As described above, each aperture 16 has therein a clip 18 of the type shown in FIG. 1. As is well known when a wire 62 is inserted between the two beams 17, 19 of the clip 18 the edges of the beams 17, 19 act in a manner so as to strip a portion of the insulation from the wire. The slots 20a to 20d described above allow for the wire to be inserted in the clip 18 in the manner to be described hereinafter. The clip 18 is made of a conductive material and therefore the stripping action establishes an electrical connection between the wire and the clip 18. The clip 18 may be retained in the aperture 16 in any one of a number of ways well known in the art. For example, the clip 18 may have a portion 21 which causes the clip 18 to be wedged in the aperture 16 when it is inserted therein. Retention in the installed position is essential so that the clip is not dislodged during repetitive installation of wires.

The clip not only has the opposed beams 17, 19 shown in FIG. 1 but may also have another connection means (not shown) which extends in a direction opposite to the direction in which the opposed beams 17, 19 extend. That second connection means extends towards the base 15 of the block 10 when inserted in the aperture 16. The second connection means may also be of the insulation displacement type or it may be of the well known wire wrap type or any other type of connection means well known in the art. For ease of illustration clip 18 is shown in FIG. 1 as having a pointed end (unnumbered) where the second connection means would be. Therefore, that connection means is available for connection from the underside of the block 10.

Typically, the block 10 is assembled in the factory by first inserting all of the clips 18 in their respective apertures 16. To facilitate the insertion of the clips the apertures may have therein channels or tracks which function to insure that the clip is inserted in the center of the aperture. The second connection means is then wired up. The underside of the block 10 is then filled with a suitable compound to thereby seal those connections. The wires connected thereto extend outside of the base and those connections can not be changed after sealing without destroying the underside of the block.

As described previously, when insulation displacement clips are used in the prior art there is used a separate hand tool by the craftsperson to insert the wire therein. In the present invention there is inserted in each pair of apertures 16 an activator 30 which functions to:

(i) provide a guide for placing of the wire prior to bringing it in contact with the clip;

(ii) easily bring the wire in contact with the clip 18 when the activator 30 is lowered into the aperture;

(iii) cover the aperture when the activator is inserted all the way therein;

(iv) provide access for testing the connection without having to raise the activator 30;

(v) allow the wire to be removed from the clip 18 to facilitate repair, replacement or any need to change connections; and (vi) eliminate the need for a separate tool.

All of the above features are embodied in the activator 30 of the present invention, a perspective of which is shown in FIG. 1. Right side, end, top and bottom views of the activator 30 are shown in FIGS. 4A to 4D, respectively. The activator will now be described with reference to these figures. The activator 30 shown in FIGS. 1, 4A to 4D is for use in a block 10 in which each projection has in it an aperture 16 of the type shown in FIG. 1 and described previously. As will be clear to those skilled in the art from the description hereinafter an activator 30 for a projection having one or a multiplicity of apertures 16 can easily be embodied using the principles shown in the figures.

The activator 30 is essentially C shaped and has two members 32, 34 which are connected to an essentially rectangular portion 36. Each of the members 32, 34 are essentially rectangular in shape and rather than being solid are divided into two parallel parts 32a, 32b, 34a, 34b which have a gap 33, 35 therebetween. The gap 33, 35 extends for the entire length of the members 32, 34. The activator 30 is inserted in each of the associated apertures 16 of the block with the members 32, 34 pointing downwardly toward the center of the block. The gap 33, 35 between the parts 32a, 32b, 34a, 34b of each member 32, 34 is necessary in order for the member 32, 34 to slide over the clip 18. The gap 33, 35 is sufficiently wide enough to allow the member to slide easily over the clip 18 and the member parts should have sufficient flexibility to allow for reasonable variations in clip thickness.

Near the top of each member 32, 34 there is a circular opening 38, 40 which goes all the way through the member 32, 34. The insulated wire 62 (see FIG. 1) to be connected to the clip 18 is inserted in this opening 38, 40 when the activator 30 is in the raised position. The diameter of the opening 38, 40 should be sufficient to accommodate the range of wire sizes to be used with the block 10. I have found it convenient to flare the opening on one side in order that the wire can be more easily passed through the member 32, 34. My invention will, however, work without such a flared opening.

The essentially rectangular portion 36 of the activator 30 is connected to the top 32c, 34c of each member 32, 34 and provides the means by which the activator 30 may be gripped so that it can be raised when inserted in the apertures 16 or the means by which it may be pushed so that it can be lowered into the apertures 16. It also provides the means for accessing the clips 18 for the purpose of testing the connections. The bottom 36a of the essentially rectangular portion 36 is connected to a rectangular base 42 which provides the interface between the top 32c, 34c of the parallel members and the rectangular portion 36. The base 42 is slightly wider than the width of the rectangular portion 36 in order that when the activator 30 is fully inserted in the apertures 16 the top of the apertures 16 is completely covered.

The means by which the clips 18 can be accessed through the activator 30 is provided by openings 44, 46 which extend through the rectangular portion 36 from its top 36b to its bottom 36a. These openings 44, 46 have a length which is approximately equal to the width of each of the member 32, 34 and a width which is approximately equal to the gap 33, 35 between the member parts. When the activator 30 is fully inserted in the aperture 16 the top end of the first connection beam 17, 19 of each of the clips 18 is just below the bottom 36a of the rectangular portions 36 and therefore the bottom of the associated opening 44, 46. A test probe may then be inserted in the opening 44, 46 to thereby make contact with the clip 18 and therefore the wire inserted therein.

As described above there is a base 42 which acts as the interface between the rectangular portion 36 and the top 32c, 34c of the members. Connected to the side 42d of the base which extends over the nonflared end of the opening 38, 40 in each member 32, 34 is a right angle flange 48. This flange 48 projects downwardly a sufficient distance to cover the openings 38, 40. There is, however, a gap 50 between the openings 38, 40 and the flange 48. This flange 48 serves as a wire stop in that the craftsperson first inserts the wire to be connected to clips 18 into the flared end of the openings 38, 40 and then pushes it through the member until it comes out of the other end of the openings and touches the flange 48. This is an indication to the craftsperson that the wire has gone through the associated member 32, 34 and in particular that part of the wire is now located in the gap 33, 35 between the member portions.

The wire stop flange 48 provides a useful means of determining that the wire has passed through the parallel members 32, 34. Without it the passage of the wire would be visible to the craftsperson. The only precaution that a craftsperson must observe if the flange 48 were not present is to make sure that not too much wire protrudes through the nonflared end of openings 38, 40. In fact, while the wire stop flange 48 may provide a helpful indication of wire passage it may also prevent the craftsperson from seeing the passage of the wire through the members 32, 34. In that case it may be desirable to cut viewing windows 52, 54 in that part of the base which is adjacent to the flange 48.

Alternatively the wire stop indication may be provided in ways other than by being part of the activator. For example, the wire stop indicators may be embodied as extensions of the rectangular projections 12 on the block 10 on the side of the projection which is opposite to the flared end part of the openings 38, 40 in the members 32, 34 of the activator 30.

Finally, it may be desirable to provide the activator 30 with means which will prevent it from being too easily withdrawn from the aperture 16 when it is raised. Such means have been provided in the activator 30 shown in the figures by providing in each of the member portions 32a, 32b, 34a, 34b a springlike beam member 56 which has at its bottom edge 56a a portion 56b which slopes unwardly a small distance towards the top 32c, 34c of the member. This springlike beam member 56 is provided by cutting a narrow slot 58 in each member portion a predetermined distance from the bottom 36d towards the top 36c of each member portion. The aperture 16 may have in it at a point near its top a riblike projection 60 such that when the activator 30 is inserted therein the projection 60 pushes the beam 56 inwardly. Once the projection 60 is cleared the beam 56 returns to its unstressed position. The sloped portion 56b of the beam 56 is such that when the activator 30 is raised the edge of the sloped portion 56b contacts the bottom of the projection 60. This keeps the activator 30 from being raised any further. Of course, sufficient force may be applied to cause the sloped portion to clear the projection or to shear the beam thereby allowing removal of the activator.

Figure 3A:
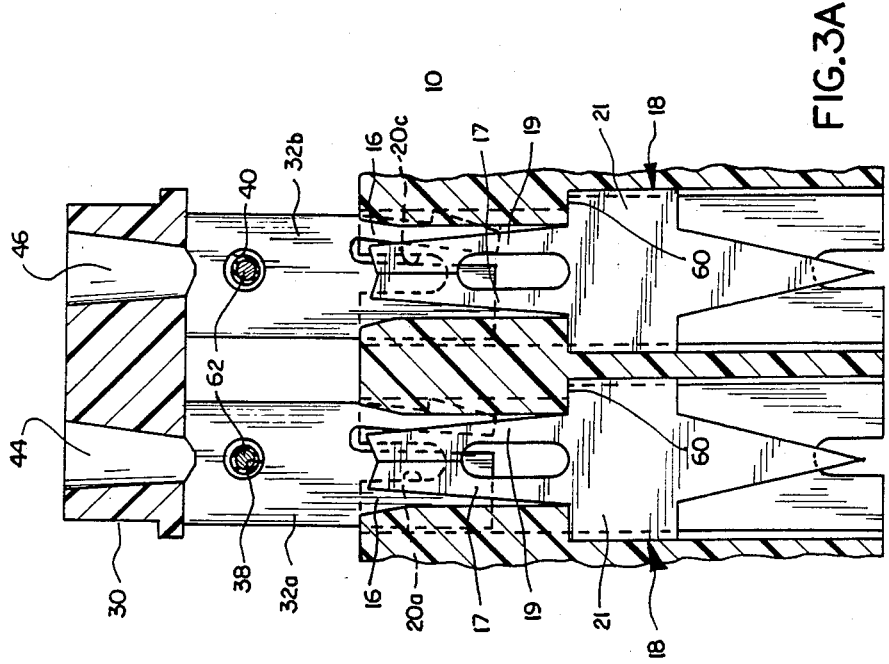
FIGS. 3A and 3B are a section of two projections taken parallel to edge 15 of the block of FIG. 1.
Figure 2A:
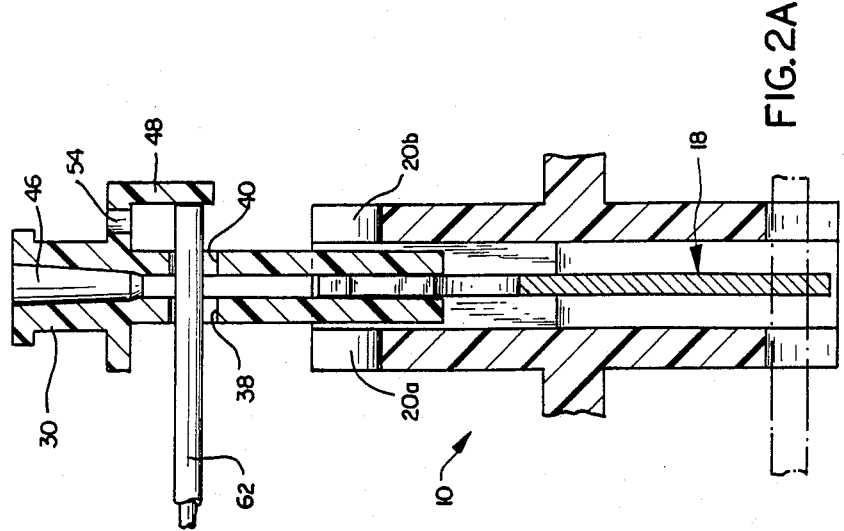
FIGS. 2A and 2B are a section of a single projection taken parallel to the front facing edge of the connector block of FIG. 1.
Figure 2B:
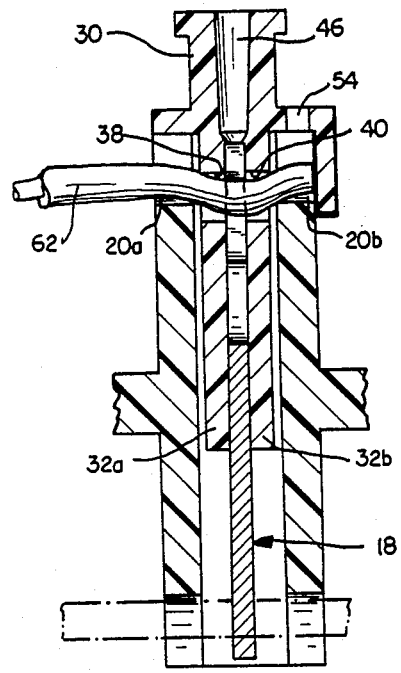
Figure 3B:
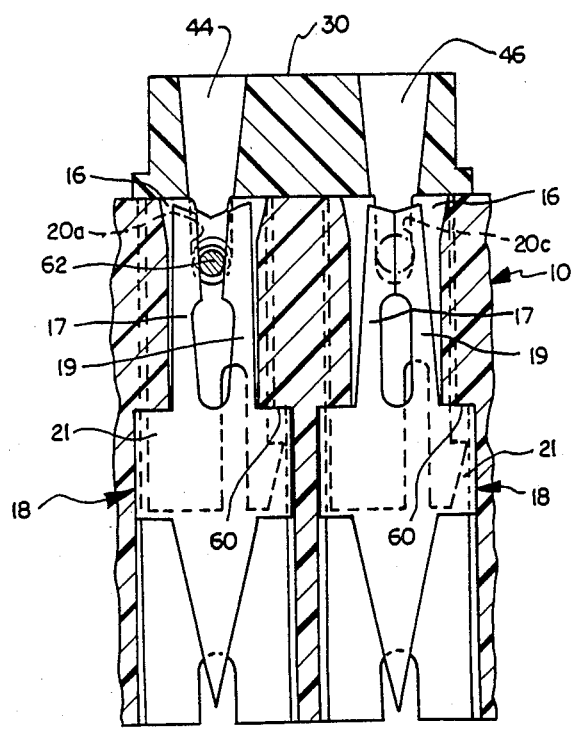
Figure 4A:
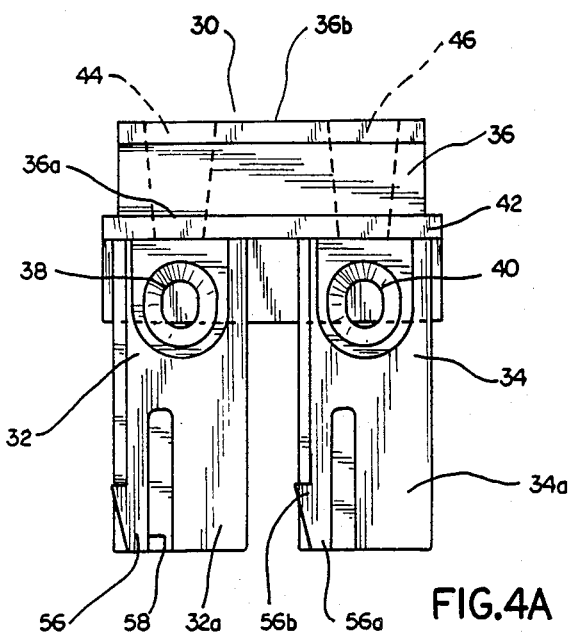
FIGS. 4A to 4D show various views of the activator embodied in accordance with the present invention.
Figure 4B:
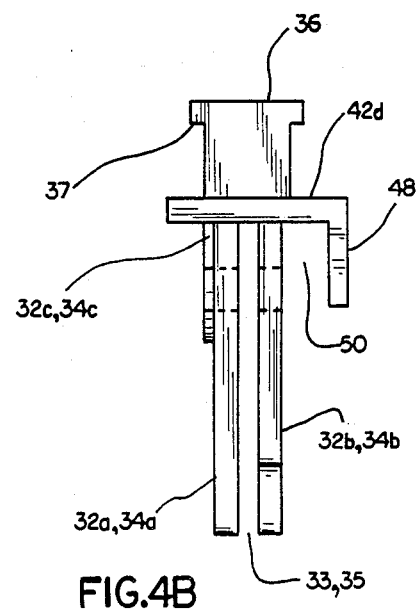
Figure 4C:
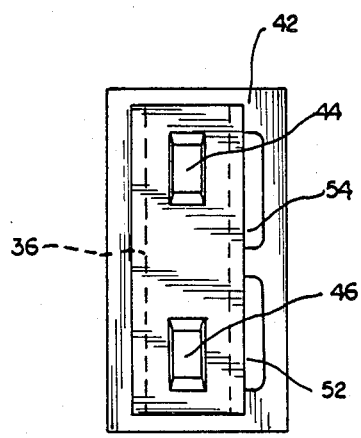
Figure 4D:
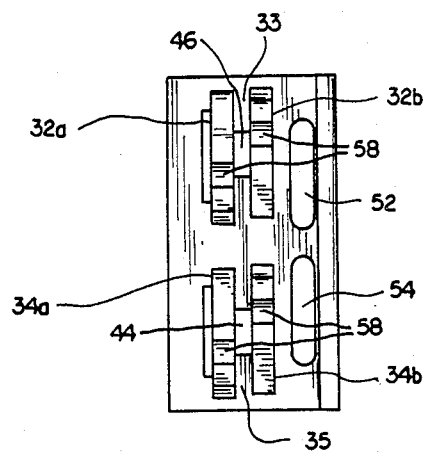

In order to fully appreciate my invention there are shown in FIGS. 2A and 2B a cross section of a projection 12 having a single clip 18 therein and in FIGS. 3A and 3B cross section of two projections 12 having two apertures 16 and two clips 18 therein. The cross section is taken through the apertures 16 in a manner such the clips 18 are fully exposed. An activator 30 has been inserted in the projection 12. The cable pair 62 to be connected to the clips 18 are first inserted in the activator 30 with the activator 30 in the fully extended position as shown in FIGS. 2A and 3A. The cable pairs are inserted in the flared end part of the opening 38, 40 and pushed through the members 32, 34 until they reach the stop 48. The activator 30 is then pushed downwardly. This causes the cable pairs to enter the slot between the two beams 17, 19 of the clip 18.

The activator 30 is pushed to its furthest downward position as shown in FIGS. 2B and 3B. The clip 18 has stripped the insulation off of the wire. This procedure completes the installation of a pair of telephone wires. The opposite procedure may be used to remove the pair of wires for purposes of repair, etc. The activator 30 may be raised by grabbing the rectangular portion 36 or by using the edge 37 on that portion 36 as a place to apply one end of a suitable lever. The raising of the activator causes the wire to be disengaged from the clip. The wire may then be withdrawn from the activator.

It should be appreciated that my invention may be used either outdoors or indoors. If used outdoors the block should be environmentally protected by filling the aperture with a suitable grease or other similar water resistant compound. If my invention is used indoors there is no necessity to use any such compound.

It should also be appreciated that the connection of the telephone wires to the associated clips takes place inside of a projection which is made of a suitable insulating material such as plastic. This reduces the possibility of and makes it highly unlikely that adjacent wires can be short circuited to each other. The activator which is also made of an insulating material provides a further means to separate adjacent electrical connections. Therefore, even if my invention is used indoors it is extremely unlikely that moisture will give rise to short circuits. It is also extremely unlikely that adjacent connections can be inadvertently short circuited by a craftsperson.

Finally, it should be appreciated that my invention provides a means by which telephone wires can be easily installed without the need for a separate tool.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A connector for connecting at least one insulated conductor comprising:
   (a) a connector block, said block comprising:
      (i) a base,
      (ii) at least one projection extending upwardly from said base, said projection having at least side walls and a top,
      (iii) an aperture extending downwardly in said projection from said top, said aperture accommodating an insulation displacing connector having bifurcating means for displacing insulation of an insulated conductor inserted in said means, said insulation displacing bifurcating means opening to said top when said connector is inserted in said aperture;

(b) actuator means for slidably fitting into said aperture, said actuator means being U-shaped and comprising:
  (i) a cap,
  (ii) first and second flat elongate projections extending outwardly from said cap, said projections being parallel to each other and forming a hollow space therebetween sufficient to allow said bifurcating means to fit into said hollow space when said actuator means is slidably fitted into said aperture,
  (iii) a circular opening included in each of said projections, said opening of sufficient diameter to allow an insulated conductor to be slid therein,
said bifurcating means displacing insulation of an insulated conductor slid through each of said flat elongate projections opening when said actuator means is slidably fitted into said aperture sufficiently such that said bifurcating means comes into contact with said conductor, said projections interacting with said side walls to allow said actuator means to be slidably fitted into said aperture.

2. The connector of claim 1 wherein said circular opening in each of said projections is near said cap.

3. The connector of claim 1 wherein said aperture extends downwardly a distance sufficient such that said insulation displacing bifurcating means is below said top.

4. The connector of claim 1 wherein said insulation displacing bifurcating means projects above said top when said connector is inserted in said aperture.

5. The connector of claim 1 wherein said side walls include therein channels and said projections include means complementary thereto, said channels and said complementary means interacting to allow said actuator means to be slidably fitted into said aperture.

6. A connector for connecting at least one insulated conductor comprising:
  (a) a connector block, said block comprising:
    (i) a base,
    (ii) at least one projection extending upwardly from said base, said projection having at least side walls and a top,
    (iii) an aperture extending downwardly in said projection from said top a distance sufficient to accommodate an insulation displacing connector having bifurcating means for displacing insulation of an insulated conductor inserted in said means, said distance such that said insulation displacing bifurcating means is below said top when said connector is inserted in said aperture;
  (b) actuator means for slidably fitting into said aperture, said actuator means being U-shaped and comprising:
    (i) a cap,
    (ii) first and second flat elongate projections extending outwardly from said cap, said projections being parallel to each other and forming a hollow space therebetween sufficient to allow said bifurcating means to fit into said hollow space when said actuator means is slidably fitted into said aperture,
    (iii) a circular opening included in each of said projections, said opening of sufficient diameter to allow an insulated conductor to be slid therein,
said bifurcating means displacing insulation of an insulated conductor slid through each of said flat elongate projections opening when said actuator means is slidably fitted into said aperture sufficiently such that said bifurcating means comes into contact with said conductor, said projections interacting with said side walls to allow said actuator means to be slidably fitted into said aperture.

7. The connector of claim 6 wherein said circular opening in each of said projections is near said cap.

8. The connector of claim 6 wherein said side walls include therein channels and said projections include means complementary thereto, said channels and said complementary means interacting to allow said actuator means to be slidably fitted into said aperture.

9. A connector for connecting at least first and second insulated conductors comprising:
  (a) a connector block, said block comprising:
    (i) a base,
    (ii) at least first and second projections extending upwardly from said base, each of said projections having at least side walls and a top,
    (iii) first and second apertures extending downwardly in said projections from said top, said first aperture being associated with said first projection and said second aperture being associated with said second projection, each of said apertures accommodating an associated one of first and second insulation displacing connectors, each of said connectors having bifurcating means for displacing insulation of an insulated conductor inserted in said means, said insulation displacing bifurcating means opening to said top when said connectors are inserted in an associated one of said first and second apertures;
  (b) actuator means for slidably fitting into said first and second apertures, said actuator means being C-shaped and comprising:
    (i) a cap,
    (ii) a first actuator arm comprising third and fourth flat elongate projections extending outwardly from said cap, said first and second projections being parallel to each other and forming a hollow space therebetween sufficient to allow said bifurcating means of said first connector to fit into said hollow space when said actuator means is slidably fitted into said apertures,
    (iii) a second actuator arm comprising first and second flat elongate projections extending outwardly from said cap, said third and fourth projections being parallel to each other and forming a hollow space therebetween sufficient to allow said bifurcating means of said second connector to fit into said hollow space when said actuator means is slidably fitted into said apertures,
    (iv) a circular opening included in each of said projections of each of said first and second actuator arms, said opening of sufficient diameter to allow an associated one of said first and second insulated conductors to be slid therein,
said bifurcating means displacing insulation of an insulated conductor slid through each of said flat elongate projections opening when said actuator means is slidably fitted into said first and second apertures sufficiently such that said bifurcating means comes into contact with said conductor, said first and second arms interacting with said side walls of said first and second apertures to allow said actuator means to be slidably fitted into said apertures.

10. The connector of claim 9 wherein said circular opening in each of said projections is near said cap.

11. The connector of claim 9 wherein each of said apertures extends downwardly a distance sufficient such that said insulation displacing bifurcating means is below said top.

12. The connector of claim 9 wherein said insulation displacing bifurcating means projects above said top when each of said connectors is inserted in said aperture.

13. The connector of claim 9 wherein said side walls include therein channels and said arms include means complementary thereto, said channels and said complementary means interacting to allow said actuator means to be slidably fitted into said apertures.

* * * * *